United States Patent

[11] 3,626,484

| | | |
|---|---|---|
| [72] | Inventor | Paul G. Kinnecom<br>St. Charles, Mo. |
| [21] | Appl. No. | 859,984 |
| [22] | Filed | Sept. 22, 1969 |
| [45] | Patented | Dec. 7, 1971 |
| [73] | Assignee | ACF Industries, Incorporated<br>New York, N.Y. |

[54] BRAKE RIGGING FOR RAILWAY FREIGHT CARS
3 Claims, 5 Drawing Figs.

[52] U.S. Cl. ................................................. 188/52
[51] Int. Cl. ........................................... B61h 13/26
[50] Field of Search ........................................... 188/49, 50, 51, 52, 53, 55, 56; 213/8

[56] References Cited
UNITED STATES PATENTS

| 864,120 | 8/1907 | Brown | 188/56 X |
|---|---|---|---|
| 2,927,662 | 3/1960 | Polanin | 188/52 X |
| 2,950,781 | 8/1960 | Tack | 188/52 |
| 3,168,201 | 2/1965 | Smith et al. | 213/8 |
| 3,184,000 | 5/1965 | Radey | 188/52 |

*Primary Examiner*—George E. A. Halvosa
*Attorney*—Eugene N. Riddle

ABSTRACT: Brake rigging for a railway freight car having a center sill structure with an open bottom and receiving a portion of the brake rigging. The truck live lever and the truck dead lever extend in a vertical direction and have upper end portions received within the center sill structure. A truck lever rod wholly within the center sill structure connects the upper ends of the truck levers and extends over the truck bolster and the body center plate. An actuating pull rod is connected to an intermediate portion of the truck live lever for actuating the truck brakes.

INVENTOR.
PAUL G. KINNECOM
BY
Eugene N. Biddle
ATTORNEY

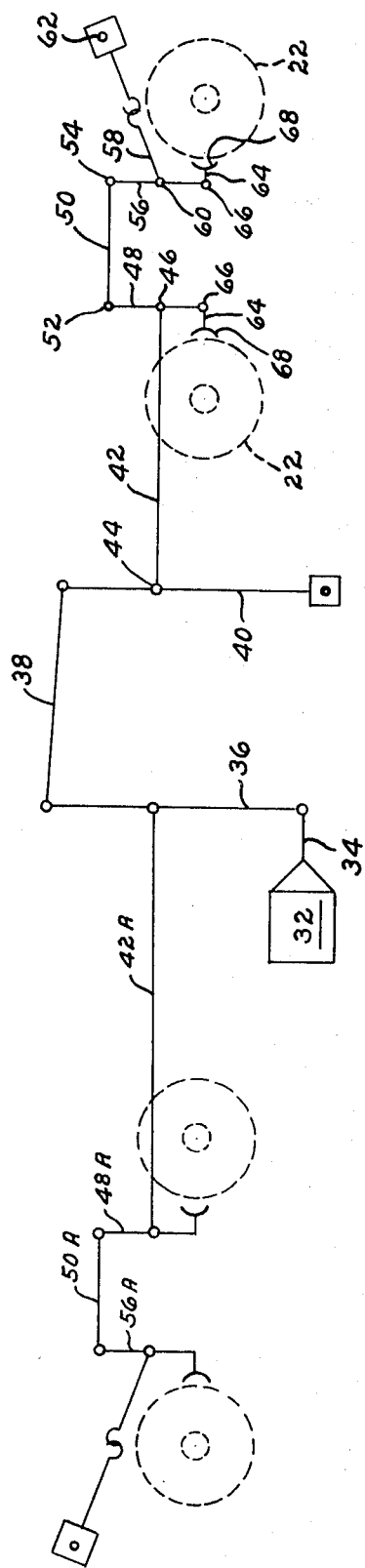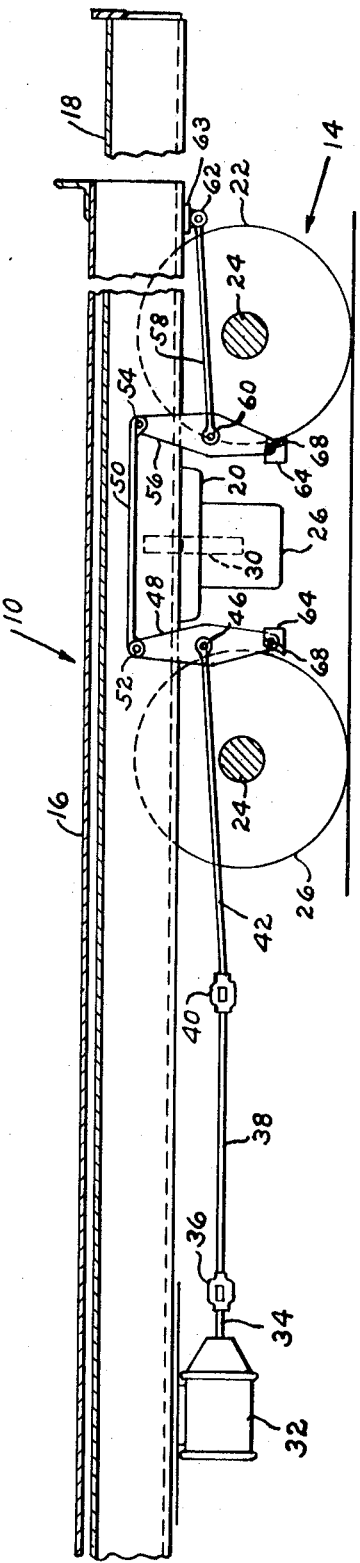

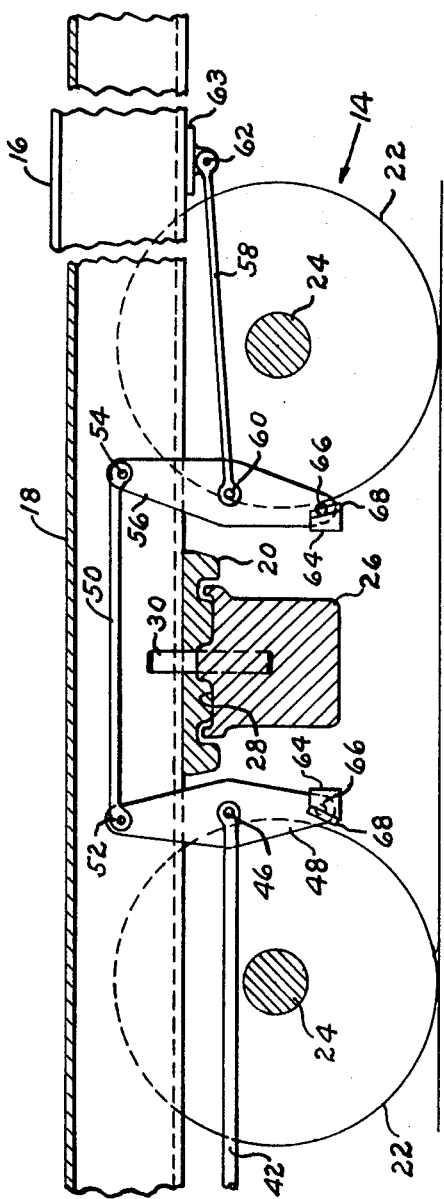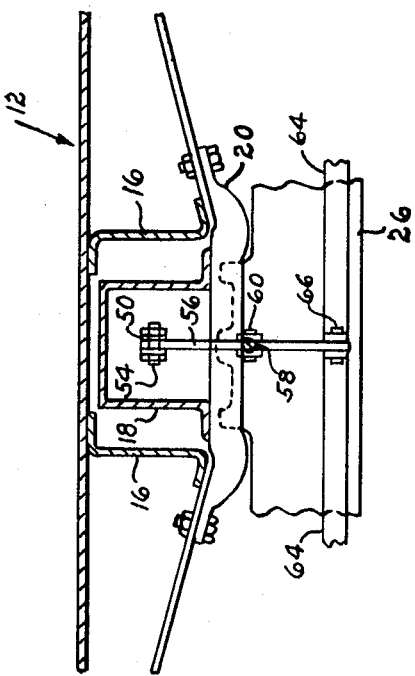

BRAKE RIGGING FOR RAILWAY FREIGHT CARS

BACKGROUND OF THE INVENTION

With certain types of railway freight cars, such as cushioned underframe boxcars mounted on trucks having a 100-ton capacity, the underframe is relatively close to the trucks and very little space is provided in which to amount the brake rigging for body mounted brake systems. It is not desirable to shorten or distort truck levers or connecting rods in order to position the various parts of the brake rigging in the space between the trucks and underframe.

DESCRIPTION OF THE INVENTION

The present invention utilizes the space within the center sill structure, particularly in the areas over the trucks, in order to obtain adequate space and clearance for the various portions of the brake rigging. The brake rigging includes a truck live lever extending vertically to a position within the center sill structure above the truck bolster and generally above the body center plate, means extending over an axle of the truck between the cylinder lever and the live lever for actuation of the live lever, a truck dead lever extending vertically to a position within the center sill structure above the truck bolster and generally above the body center plate, brake beams connected adjacent the lower ends of the live lever and the dead lever, and a truck lever rod connecting the upper ends of the truck live lever and the truck dead lever, the truck lever rod being wholly within the center sill structure and extending in a generally horizontal direction over the truck bolster and over the body center plate.

The invention accordingly comprises the constructions hereinafter described, the scope of the invention being indicated in the following claims.

In the accompanying drawings, in which one embodiment of the invention is illustrated, FIG. 1 is a top plan view of an end portion of a railway freight car illustrating the brake rigging comprising the present invention mounted thereon;

FIG. 2 is a side elevation of the end portion of the railway freight car illustrated in FIG. 1;

FIG. 3 is an enlarged longitudinal section indicating parts of the brake rigging being within the center sill structure;

FIG. 4 is an enlarged transverse section illustrating parts of the brake rigging within the center sill structures; and FIG. 5 is a view of the brake diagram illustrated diagrammatically.

Figure 1:
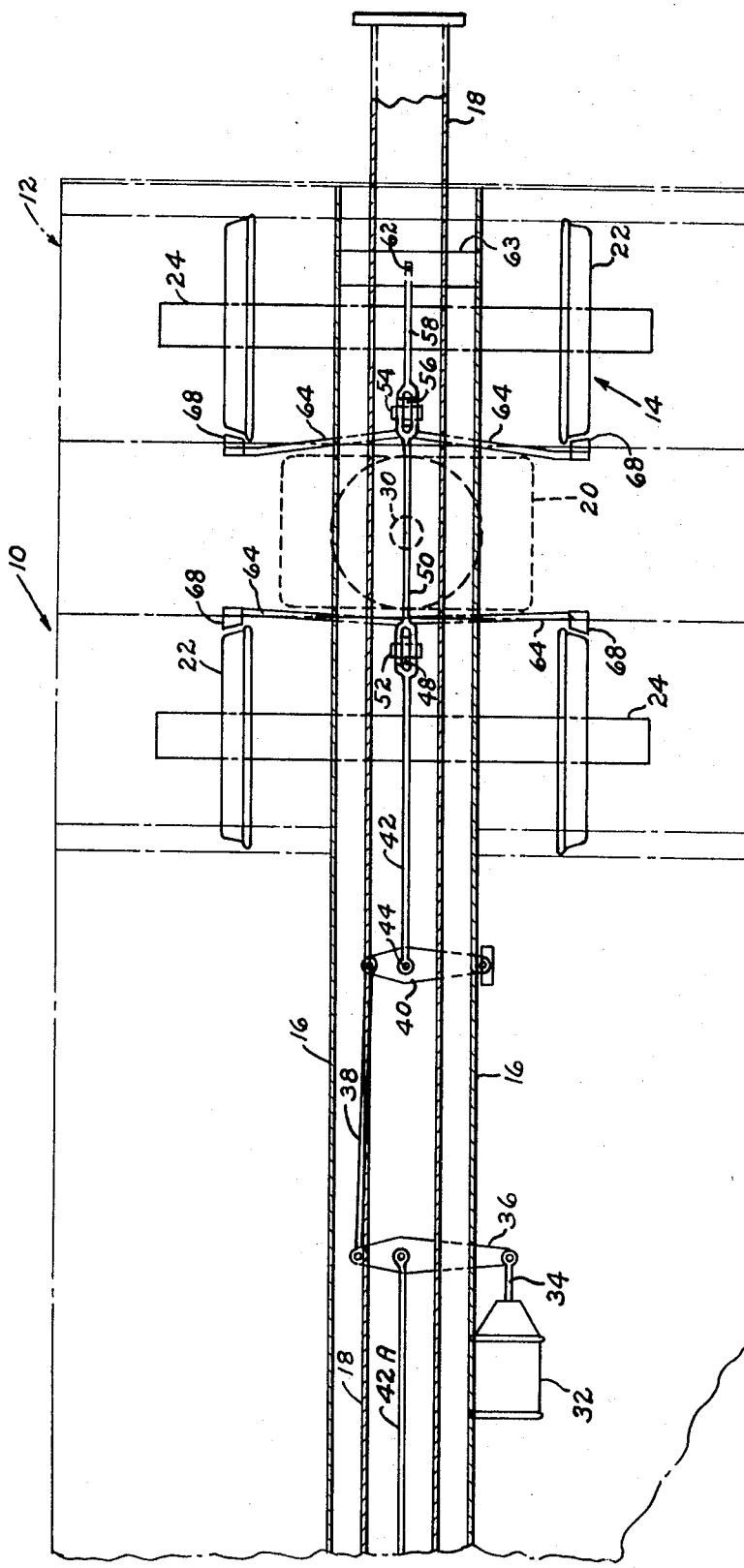

Referring to the drawings, a railway freight car is indicated generally at 10 and includes an underframe 12 mounted on four-wheel trucks 14. Underframe 12 has a pair of fixed Z-shaped center sill members 16 spaced from each other, and a hat-shaped center sill 18 mounted for sliding movement between fixed sill members 16. A body center plate 20 extends between fixed sill members 16 over each truck 14. Truck 14 includes wheels 22 and axles 24. A truck bolster 26 has a bowl-shaped center plate 28 and a center pin 30 which receives body center plate 20 as shown in FIG. 3.

The brake rigging for railway freight car 10 includes a brake cylinder 32 having a piston rod 34 extending therefrom and connected to cylinder lever 36. Connecting rod 38 extends between cylinder lever 36 and body lever 40. A pull rod 42 for one truck 14 is pivotally connected at 44 to body lever 40, and pivotally connected at 46 to truck live lever 48. Truck lever connecting rod 50 is pivotally connected to the upper end of lever 48 at 52 and is pivotally connected at 54 to upper end of truck lead lever 56. An anchor rod 58 is pivotally connected at 60 to dead lever 56 and has its other end anchored at 62 to a plate 63 secured to the lower flanges of fixed sill members 16 of underframe 12. Brake beams generally indicated 64 are pivotally connected at 66 to the lower ends of truck levers 48 and 56 and brakeshoes 68 are pivotally mounted on brake beams 66. Upon actuation of brake cylinder 32, pull rod 42 exerts a force on truck live lever 48 and dead lever 56. Brake beams 64 and brakeshoes 68 then apply a braking force to wheels 22 of one truck 14. It is noted that pull rod 42 and anchor rod 58 are pivotally connected to respective levers 48 and 56 intermediate the length of levers 48 and 56. This results in a relatively small movement of pull rod 42 and a relatively small travel of live lever 48 since the force is applied from the center of lever 48 at pivot 46. Likewise, a small travel of dead lever 56 is effected since lever 56 pivots about pivot 60.

The brakes on the other truck 14 are applied in a similar manner. A pull rod 42A is connected to live lever 48A, connecting rod 50A, and dead lever 56A for applying a braking force to the other truck 14 upon actuation of brake cylinder 32.

As shown particularly in FIGS. 3 and 4, the upper end portions of live lever 48 and dead lever 56 are housed within the space of sliding center sill 18 which is hat-shaped and has an open bottom. Lever 48 on one side of truck bolster 26 and lever 56 on the other side of truck bolster 26 both extend upwardly to a position above body center plate 20. Connecting rod 50 is wholly within the confines of sliding center sill 18 and extends over body center plate 20 and over truck bolster 26. Thus, full advantage is taken of the space provided by the center sill structure. Connecting rod 50A and levers 48A, 56A are arranged in a manner similar to connecting rod 50 and levers 48, 56.

While the present braking arrangement has been illustrated as applied to a cushioned underframe freight car having a sliding center sill, it is to be understood that this braking arrangement may be applied to a fixed center sill construction.

What is claimed is:

1. A brake mechanism for a railway car having a center sill structure, a body center plate structure extending transversely of the lower portion of the center sill structure, and a four-wheel truck having a bolster and a truck center plate receiving the body center plate; said brake mechanism comprising a brake cylinder, a piston rod extending from said cylinder, a cylinder lever connected to said piston rod, a truck live lever extending upwardly in a vertical direction within the center sill structure to a position above the truck bolster and above the body center plate, means extending between said cylinder lever and said truck live lever for actuation of said live lever, said means extending over an axle of said truck and being pivotally connected to said live lever intermediate its length, a truck dead lever extending upwardly in a vertical direction within the center sill structure to a position above the truck bolster and above the body center plate, brake beams connected adjacent the lower ends of said live lever and said dead lever, and a truck lever rod connecting the upper ends of said truck live lever and said truck dead lever, said truck lever rod being wholly within the center sill structure and extending in a generally horizontal direction over the truck bolster and over the body center plate.

2. A brake mechanism for a railway car as set forth in claim 1, wherein said center sill structure comprises a pair of Z-shaped fixed sill members spaced from each other and a hat-shaped sill member mounted for relative sliding movement between the Z-shaped fixed sill members, said truck levers extending upwardly within the hat-shaped sill member and said truck rod being wholly within the confines of said hat-shaped sill member.

3. A brake mechanism for a railway car as set forth in claim 1, wherein means anchor said truck dead lever to the body of the railway car, said anchor means being pivotally connected to said dead lever intermediate the length of the dead lever.

* * * * *